United States Patent
Cavanaugh et al.

[19]

[11] Patent Number: 5,573,317
[45] Date of Patent: Nov. 12, 1996

[54] BRACKET APPARATUS FOR A CABINET

[75] Inventors: Barry A. Cavanaugh; Arthur H. Ozaki, both of Escondido, Calif.

[73] Assignees: Sony Corporation, Tokyo, Japan; Sony Electronics Inc., Park Ridge, N.J.

[21] Appl. No.: 438,597

[22] Filed: May 10, 1995

[51] Int. Cl.⁶ .............................. A47B 5/00; A47B 81/06
[52] U.S. Cl. ...................... 312/7.2; 312/242; 312/245; 312/223.1; 312/223.6; 220/2.1 A; 220/2.3 R; 220/2.3 A; 200/296; 200/294
[58] Field of Search .................... 312/7.2, 242, 245, 312/265.5, 265.4, 223.1, 223.6; 220/2.1 A, 2.3 R, 2.3 A; 200/296, 294; 403/261, 252, 282

[56] References Cited

U.S. PATENT DOCUMENTS

| | | | |
|---|---|---|---|
| 2,779,833 | 1/1957 | Farison | 200/296 X |
| 3,213,213 | 10/1965 | DeSmidt | 200/296 X |
| 3,828,291 | 8/1974 | Urani | 200/296 X |
| 4,080,522 | 3/1978 | Schimmels | 200/296 X |
| 4,340,795 | 7/1982 | Arthur | 200/296 X |
| 4,406,936 | 9/1983 | Ohashi | 200/296 |
| 5,217,190 | 6/1993 | Reed et al. | 200/296 X |
| 5,235,493 | 8/1993 | Yu | 312/265.5 X |

*Primary Examiner*—Peter M. Cuomo
*Assistant Examiner*—Rodney B. White
*Attorney, Agent, or Firm*—Pasquale Musacchio; Jerry A. Miller

[57] ABSTRACT

A bracket for a cabinet, such as the type used for television sets or other electronic devices, wherein the cabinet includes a first flange having a predetermined flange thickness. The bracket includes a housing having top and bottom ribs and a mounting flange having an aperture. The top and bottom ribs are spaced apart from the mounting flange by a predetermined distance which is less than the flange thickness. As such, upon insertion of the first flange between the top and bottom ribs and the mounting flange, a press fit is formed. This removably secures the top and bottom ribs and the mounting flange to the first flange without the use of fasteners. In addition, the housing includes at least one clip element for removably securing a printed circuit board having a switch which is accessible through the aperture.

10 Claims, 3 Drawing Sheets

5,573,317

BRACKET APPARATUS FOR A CABINET

FIELD OF THE INVENTION

This invention relates to apparatus for securing electrical components to cabinets for electronic devices, and more particularly, to apparatus which enables the securing of an electronic component to a cabinet without the use of fasteners.

BACKGROUND OF THE INVENTION

Electronic apparatus, such as television sets, computer monitors and others, include a cabinet which houses various electrical components. Such cabinets typically include a front portion, or beznet, and a rear cover which is secured to the beznet. Devices associated with the operation of the electronic apparatus, such as switches, are mounted on the cabinet so as to enable an operator to access the device. Such devices are secured to the cabinet by fasteners such as screws. By way of example, a television set manufactured by Phillips and designated as Model No. 29XS8674/54 R discloses a bracket having a main power switch, wherein the bracket is secured to the beznet by screws. The utilization of fasteners requires that fastening elements such as thru holes, threaded holes and others be provided within the cabinet to enable fastening. However, the fabrication of such fastening elements requires the use of relatively complicated manufacturing processes. This is a disadvantage since such processes increase manufacturing costs.

Further, components for a television set, such as the main power switch for turning the television set on or off, are typically manufactured on an assembly line. Upon completion of the manufacturing process, the main power switch becomes functional, thus enabling an operator to turn on the television set. This enables the testing of selected operating parameters to verify operation of the television set. It would be desirable for the switch to be functional during the manufacturing process so as to enable selected testing before manufacture of the television set is completed. This would result in a reduction in manufacturing time and thus costs.

Therefore, it is an object of the present invention to provide a bracket apparatus having a switch for turning on a television set, wherein the bracket apparatus is removably secured to the beznet during the manufacturing process without necessitating that the rear cover be secured to the beznet. It is a further object of the present invention to provide a bracket apparatus which may be secured to a cabinet without the use of fasteners.

SUMMARY OF THE INVENTION

A bracket for a cabinet which includes a first flange having a predetermined flange thickness. The bracket includes a housing having at least one rib and a mounting flange having an aperture. The rib is spaced apart from the mounting flange by a predetermined distance which is less than the flange thickness, such that upon insertion of the first flange between the rib and the mounting flange, a press fit is formed for removably securing the rib and the mounting flange to the first flange. In addition, the housing includes at least one clip element for removably securing a printed circuit board having a switch which is accessible through the aperture.

DETAILED DESCRIPTION OF THE INVENTION

The present invention will now be described by referring to FIGS. 1–4, wherein like elements are referenced by like referenced numerals.

Figure 1:
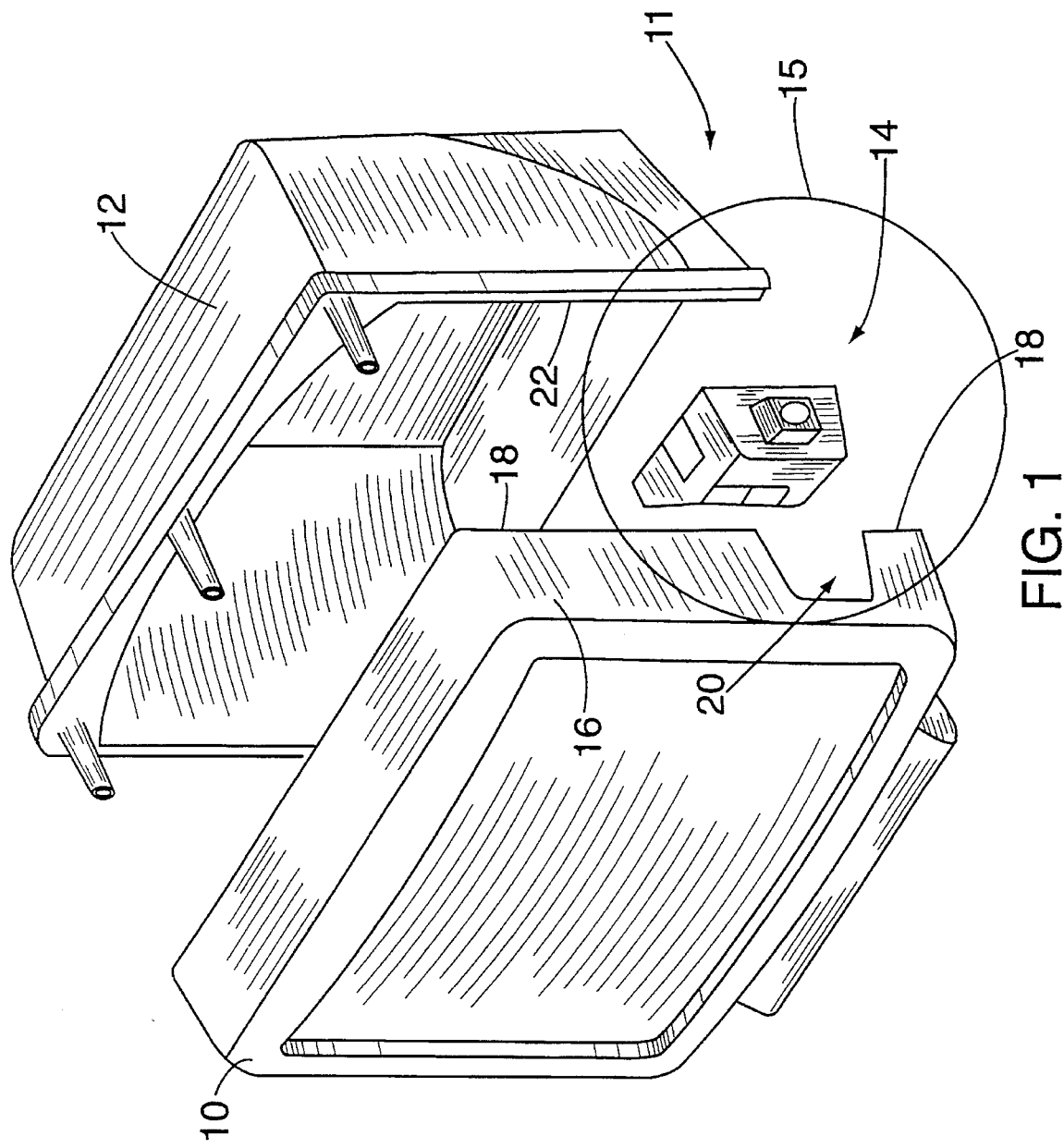
FIG. 1 an exploded view of a television cabinet and a bracket apparatus in accordance with the present invention.

Referring to FIG. 1, an exploded view of a television cabinet 11 having a front portion, or beznet 10, and a rear cover 12 is shown. A bracket apparatus 14 in accordance with the present invention is shown positioned between the beznet 10 and the rear cover 12. It is noted that the bracket apparatus 14 may also be used in conjunction with other electronic apparatus having a cabinet such as computer monitors, stereo systems and video cassette recorders. The beznet 10 includes a side wall 16 having a first vertical edge 18 and a notch 20 which extends through a portion of the first edge 18. The rear cover 12 includes a second vertical edge 22 which is adapted to abut against the first edge 18 and the bracket apparatus 14.

Figure 2:
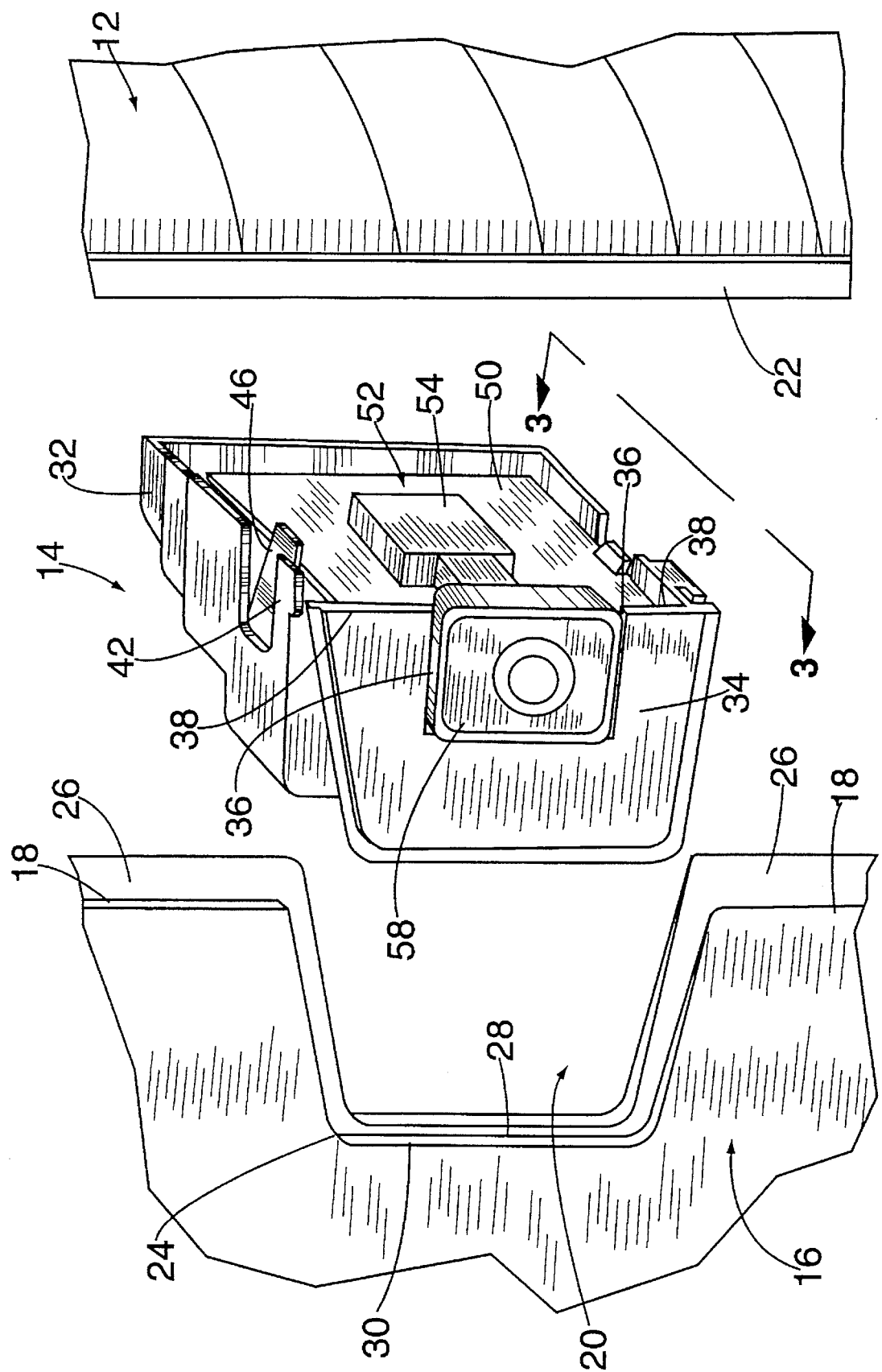
FIG. 2 is an enlarged view of balloon section 15 of FIG. 1.
Figure 3:
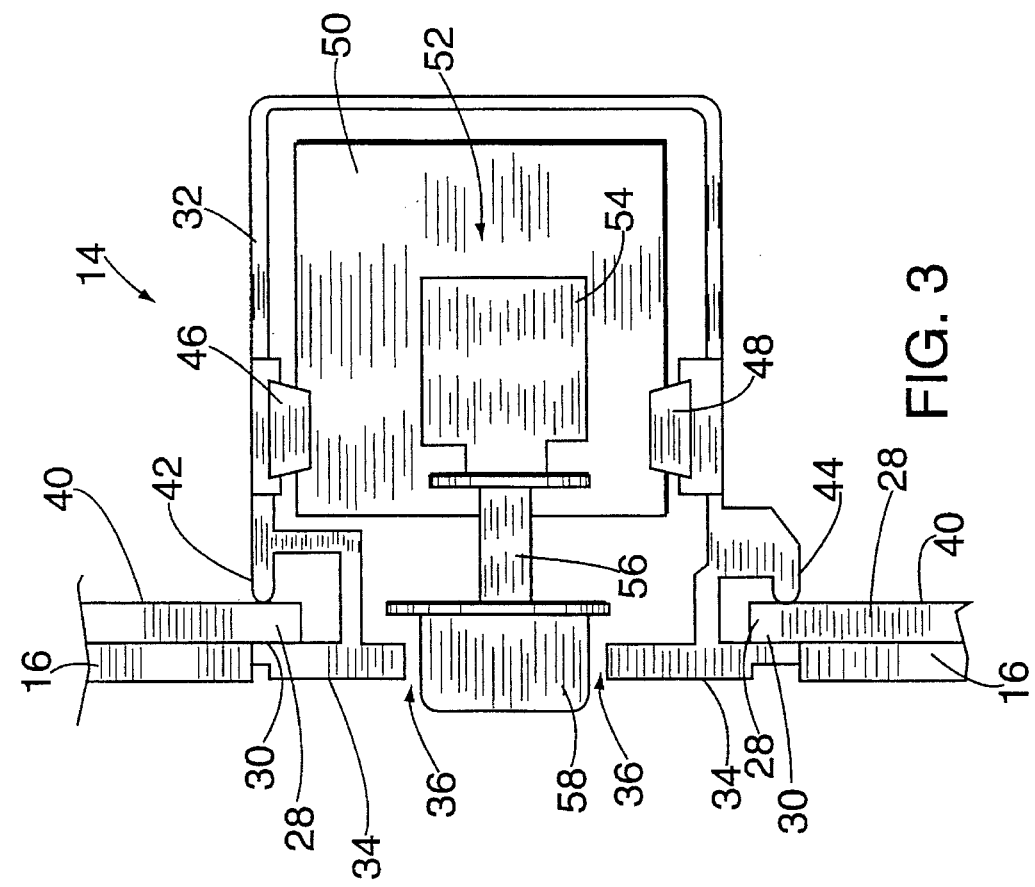
FIG. 3 is a side view along view line 3—3 of FIG. 2 which shows a mounting flange in an assembled position.

Referring to FIG. 2 in conjunction with FIG. 1, an enlarged view of balloon section 15 is shown. The notch 20 is defined by a substantially C-shaped peripheral edge 24. The side wall 16 includes a wall flange element 26 which extends from the first edge 18 and from the peripheral edge 24 to form a substantially C-shaped notch flange element 28 having a flange top surface 30 within the notch 20. The bracket apparatus 14 includes a housing 32 and a mounting flange element 34. The mounting flange 34 is shaped to correspond to the shape of the peripheral edge 24. Further, the mounting flange 34 includes an aperture 36 and a vertical bracket edge 38 which extends through the aperture 36. In order to position the bracket apparatus 14 into an assembled position (as shown in FIG. 3) in the beznet 10, the mounting flange 34 is positioned onto the flange top surface 30. The mounting flange 34 is then slid on the flange top surface 30 and into the notch 20 until the bracket edge 38 corresponds with the first edge 18. In the assembled position, the flange top surface 30 is substantially covered by the mounting flange 34 to provide an integrated appearance which enhances aesthetic appeal of the cabinet.

Referring to FIG. 3 in conjunction with FIG. 2, a side view along view line 3—3 of FIG. 2 is shown. In FIG. 3, the mounting flange 34 is shown in the assembled position. The notch flange 28 has a predetermined flange thickness. Further, the housing 32 includes top 42 and bottom 44 ribs each of which are spaced apart from the mounting flange 34 by a predetermined distance which is less than the flange thickness by an amount suitable for forming an interference, or press, fit. In addition, the housing 32, mounting flange 34 and the top 42 and bottom ribs 44 are each fabricated from a resilient material such as plastic. Upon assembly, the notch flange 28 is inserted between the mounting flange 34 and the top 42 and bottom 44 ribs. The resiliency of the housing 32, mounting flange 34 and the top 42 and bottom 44 ribs causes the generation of a clamping force which clamps the notch flange 28 between the top 42 and bottom 44 ribs to form the press fit. This removably secures the bracket apparatus 14 to the notch flange 28 and thus side wall 16 without the use of fasteners, thus reducing complexity and manufacturing costs. Further, the bracket apparatus 14 is removably secured without the rear cover 12 being secured to the beznet 10. This provides access to interior sections of the television set during the manufacturing process, thus enabling the performance of various manufacturing operations as the television set is being tested.

The housing 32 further includes top 46 and bottom 48 restraining clips. The top 46 and bottom 48 clips serve to releasably secure a printed circuit board 50 or other element within the housing 32. A switch is mounted on the printed circuit board 50. The switch may be any type of commercially available switch such as a two position push switch 52 having a body 54 and a shaft 56 which extends from the body 54. In this type of switch, the shaft 56 may be moved between a first, or off, position wherein the shaft 56 is fully extended out of the body 54 and a second, or on, position wherein the shaft 56 is partially inserted within the body 54. A button element 58 is affixed to an end of the shaft 56. The button element 58 extends through the aperture 36 to enable manipulation of the push switch 52 by an operator. In use, an operator may turn the push switch 52 on or off by depressing the button element 58 as desired. In a preferred embodiment, the push switch 52 is electrically connected to serve as a main power switch for turning the television set on or off. As such, this enables the testing of selected operating parameters of the television set before manufacture of the television set is completed. Further, such testing is performed in conjunction with the manufacture of the television set due to the access provided by not having the rear cover 12 assembled to the beznet 10. As a result, manufacturing time and thus costs, are reduced.

Figure 4:
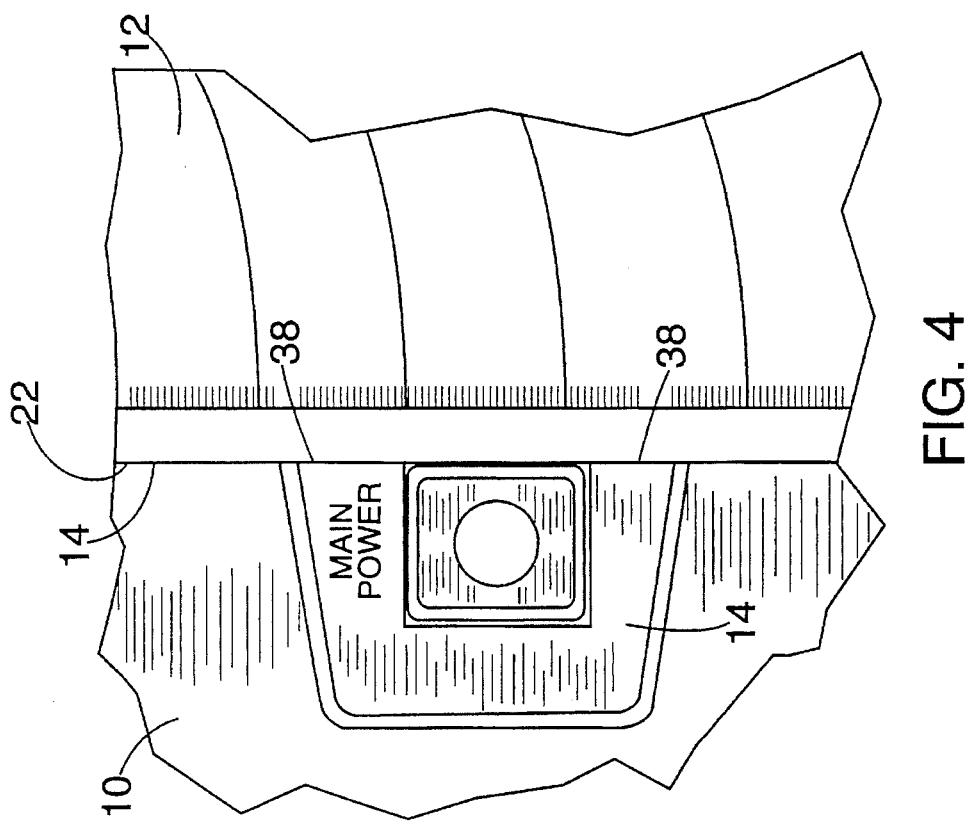
FIG. 4 is an enlarged view of balloon section 15 of FIG. 1 which depicts the bracket apparatus secured between a beznet and a rear cover.

Referring to FIG. 4 in conjunction with FIG. 1, an enlarged view of balloon section 15 is shown wherein the beznet 10, bracket apparatus 14 and rear cover 12 are shown assembled. Upon placement of the bracket apparatus 14 in the assembled position within the notch 20, the rear cover 12 is secured to the beznet 10 by conventional fasteners. When this occurs, the second edge 22 abuts the first edge 18 and the bracket edge 38 to thus inhibit movement of the bracket apparatus 14 out of the notch 20, thus securing the bracket apparatus 14 within the beznet 10. Further, the second edge 22 is adapted to substantially cover the wall flange 26, thus enhancing aesthetic appeal. As such, the bracket apparatus 14 and thus push switch 52 are secured to the cabinet 11 without the use of fasteners. Further, it is noted that the notch 20 may be formed in other walls of the cabinet 11 to provide other desired placements of the bracket apparatus 14.

Thus it is apparent that in accordance with the present invention, an apparatus that fully satisfies the objectives, aims and advantages is set forth above. While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A bracket for a cabinet, said cabinet having a notch formed in a side wall, said notch including a first flange having a predetermined flange thickness, comprising:

a housing having at least one rib and a mounting flange having an aperture, wherein said rib is spaced apart from said mounting flange by a predetermined distance which is less than said flange thickness, such that upon insertion of said housing in said notch, said first flange is inserted between said rib and said mounting flange to form a press fit between said first flange, said rib and said mounting flange for removably securing said rib and said mounting flange to said first flange;

said housing further including at least one clip element for removably securing within said housing a device having activation means for activating or deactivating said device, wherein said activation means extend through said aperture.

2. The bracket according to claim 1, wherein said housing, rib and mounting flange are fabricated from plastic.

3. The bracket according to claim 1, wherein said housing includes two ribs.

4. The bracket according to claim 1, wherein said device is a switch.

5. A bracket for a cabinet, said cabinet having a notch formed in a side wall, said notch including a first flange having a predetermined flange thickness, comprising:

a housing having top and bottom ribs and a mounting flange having an aperture, wherein said top and bottom ribs are spaced apart from said mounting flange by a predetermined distance which is less than said flange thickness, wherein upon insertion of said housing in said notch, said first flange is inserted between said top and bottom ribs and said mounting flange into an assembled position to form a press fit between said first flange, said top and bottom ribs and said mounting flange for removably securing said top and bottom ribs and said mounting flange to said first flange, and wherein said mounting flange substantially covers said first flange when located in said assembled position;

said housing further including top and bottom clips for removably securing within said housing a printed circuit board having a switch mounted thereon, said switch having activation means for activating or deactivating said switch, wherein said activation means extend through said aperture.

6. The bracket according to claim 5, wherein said housing, rib and mounting flange are fabricated from plastic.

7. A cabinet for housing an electrical device, comprising:

a front section having a side wall which includes a first edge and a notch which extends through said first edge, said notch including a first flange having a predetermined thickness;

a bracket having a housing which includes at least one rib and a mounting flange having a bracket edge and an aperture, wherein said rib is spaced apart from said mounting flange by a predetermined distance which is less than said flange thickness, such that upon insertion of said housing in said notch, said first flange is inserted between said rib and said mounting flange into an assembled position wherein said bracket edge corresponds with said first edge to form a press fit between said first flange, said rib and said mounting flange for removably securing said rib and said mounting flange to said first flange and thus within said notch, and wherein said housing further includes at least one clip element for removably securing within said housing a device having activation means for activating or deactivating said device, wherein said activation means extend through said aperture; and said cabinet further comprising a rear section secured to said front section, said rear section having a second edge which abuts against said first edge and said bracket edge to secure said bracket and thus said device to said front section.

8. The bracket according to claim 7, wherein said housing, rib and mounting flange are fabricated from plastic.

9. The bracket according to claim 7, wherein said housing includes two ribs.

10. The bracket according to claim 7, wherein said device is a switch.

* * * * *